United States Patent
Gustavson et al.

(10) Patent No.: US 7,469,266 B2
(45) Date of Patent: Dec. 23, 2008

(54) METHOD AND STRUCTURE FOR PRODUCING HIGH PERFORMANCE LINEAR ALGEBRA ROUTINES USING REGISTER BLOCK DATA FORMAT ROUTINES

(75) Inventors: Fred Gehrung Gustavson, Briarcliff Manor, NY (US); John A. Gunnels, Mt. Kisco, NY (US); James C. Sexton, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 626 days.

(21) Appl. No.: 10/671,888

(22) Filed: Sep. 29, 2003

(65) Prior Publication Data

US 2005/0071409 A1 Mar. 31, 2005

(51) Int. Cl.
*G06F 7/38* (2006.01)
(52) U.S. Cl. .................................. 708/520; 708/607
(58) Field of Classification Search ................ 708/446, 708/514, 520, 607, 400, 401
See application file for complete search history.

(56) References Cited

U.S. PATENT DOCUMENTS

| | | | |
|---|---|---|---|
| 5,025,407 A * | 6/1991 | Gulley et al. ................ 708/514 |
| 5,099,447 A | 3/1992 | Myszewski |
| 5,513,366 A | 4/1996 | Agarwal et al. |
| 5,644,517 A * | 7/1997 | Ho ............................. 708/401 |
| 5,825,677 A | 10/1998 | Agarwal et al. |
| 5,944,819 A | 8/1999 | Kumar et al. |
| 5,983,230 A | 11/1999 | Gilbert et al. |
| 6,021,420 A * | 2/2000 | Takamuki ................... 708/401 |
| 6,115,730 A | 9/2000 | Dhablania et al. |
| 6,357,041 B1 | 3/2002 | Pingali et al. |
| 6,470,368 B1 | 10/2002 | Garg et al. |
| 6,507,892 B1 | 1/2003 | Mulla et al. |
| 6,601,080 B1 | 7/2003 | Garg |
| 6,675,106 B1 | 1/2004 | Keenan et al. |
| 6,898,691 B2 | 5/2005 | Blomgren et al. |
| 6,901,422 B1 | 5/2005 | Sazegari |
| 6,959,363 B2 | 10/2005 | Southwell et al. |
| 7,028,168 B2 | 4/2006 | Wadleigh |
| 7,031,994 B2 * | 4/2006 | Lao et al. .................... 708/400 |
| 2003/0088600 A1 | 5/2003 | Lao et al. |

(Continued)

OTHER PUBLICATIONS

Vol. 1, "Foundations of computer-Aided Chemical Process Design" Copyright 1981, American Institute of Chemical Engineering (2-Volume Series), pp. 77-143.

(Continued)

*Primary Examiner*—Chuong D Ngo
(74) *Attorney, Agent, or Firm*—Stephen C. Kaufman, Esq.; McGinn IP Law Group, PLLC

(57) ABSTRACT

A method (and structure) of executing a matrix operation, includes, for a matrix A, separating the matrix A into blocks, each block having a size p-by-q. The blocks of size p-by-q are then stored in a cache or memory in at least one of the two following ways. The elements in at least one of the blocks is stored in a format in which elements of the block occupy a location different from an original location in the block, and/or the blocks of size p-by-q are stored in a format in which at least one block occupies a position different relative to its original position in the matrix A.

13 Claims, 6 Drawing Sheets

U.S. PATENT DOCUMENTS

2004/0139340 A1 7/2004 Johnson et al.
2004/0148324 A1 7/2004 Garg

OTHER PUBLICATIONS

Phillip et al., PLAPACK: Parallel Linear Algebra Package Design Overview, 1997, IEEE Proceedings of the ACM/IEEE SC97 Conference.

Agarwal et al., A High Performance Algorithm Using Pre-Processing for the Sparse Matrix-Vector Multiplication, 1992, IEEE, pp. 32-41.

Fred G. Gustavson and Andre Henriksson and Isak Jonsson and Bo Kagstrom and Per Ling: Superscalar GEMM-based Level 3 BLAS The On-going Evolution of a Portable and High-Performance Library (1998); Applied Parallel Computing, Published 1998, Springer, pp. 207-215.

Gunnels, et al., "A Family of High-Performance Matrix Multiplication Algorithms", ICCS 2001, LNCS 2073, pp. 51-60, 2001 (also available at http://www.cs.utexas.edu/users/flame/pubs/ICCS2001.pdf).

Gunnels, et al., "A Novel Theoretical Model produces Matrix Multiplication Algorithms That Predict Current Practice", IBM Research Report RC23443 (W0411-176), Nov. 19, 2004.

"Improving performance of linear algebra algorithms for dense matrices, using algorithmic prefetch" R. C. Agarwal, F. G. Gustavson , M. Zubair; IBM Journal of Research and Development; vol. 38, Issue 3 (May 1994); pp. 265-275; Year of Publication: 1994.

Vinod et al., A Framework for high-performance matrix multiplication based on hierarchical abstractions, algorithms and optimized low-level kernels, 2002, Concurrency and Computation: Practice and Experience 14(10): 805-839.

* cited by examiner

METHOD AND STRUCTURE FOR PRODUCING HIGH PERFORMANCE LINEAR ALGEBRA ROUTINES USING REGISTER BLOCK DATA FORMAT ROUTINES

CROSS-REFERENCE TO RELATED APPLICATIONS

The following seven applications, including the present Application, are related: 1. U.S. patent application Ser. No. 10/671,887, filed on Sep. 29, 2003, to Gustavson et al., entitled "METHOD AND STRUCTURE FOR PRODUCING HIGH PERFORMANCE LINEAR ALGEBRA ROUTINES USING COMPOSITE BLOCKING BASED ON L1 CACHE SIZE";

2. U.S. patent application Ser. No. 10/671,933, filed on Sep. 29, 2003, to Gustavson et al., entitled "METHOD AND STRUCTURE FOR PRODUCING HIGH PERFORMANCE LINEAR ALGEBRA ROUTINES USING A HYBRID FULL PACKED STORAGE FORMAT";

3. U.S. patent application Ser. No. 10/671,888, filed on Sep. 29, 2003, to Gustavson et al., entitled "METHOD AND STRUCTURE FOR PRODUCING HIGH PERFORMANCE LINEAR ALGEBRA ROUTINES USING REGISTER BLOCK DATA FORMAT";

4. U.S. patent application Ser. No. 10/671,889, filed on Sep. 29, 2003, to Gustavson et al., entitled "METHOD AND STRUCTURE FOR PRODUCING HIGH PERFORMANCE LINEAR ALGEBRA ROUTINES USING LEVEL 3 PREFETCHING FOR KERNEL ROUTINES";

5. U.S. patent application Ser. No. 10/671,937, filed on Sep. 29, 2003, to Gustavson et al., entitled "METHOD AND STRUCTURE FOR PRODUCING HIGH PERFORMANCE LINEAR ALGEBRA ROUTINES USING PRELOADING OF FLOATING POINT REGISTERS";

6. U.S. patent application Ser. No. 10/671,935, filed on Sep. 29, 2003, to Gustavson et al., entitled "METHOD AND STRUCTURE FOR PRODUCING HIGH PERFORMANCE LINEAR ALGEBRA ROUTINES USING A SELECTABLE ONE OF SIX POSSIBLE LEVEL 3 L1 KERNEL ROUTINES"; and 7. U.S. patent application Ser. No. 10/671,934, filed on Sep. 29, 2003, to Gustavson et al., entitled "METHOD AND STRUCTURE FOR PRODUCING HIGH PERFORMANCE LINEAR ALGEBRA ROUTINES USING STREAMING", all assigned to the present assignee, and all incorporated herein by reference.

BACKGROUND OF THE INVENTION

1. Field of the Invention

The present invention relates generally to techniques for improving performance for linear algebra routines. More specifically, a register block data format provides a method to mask a hardware-level instruction shortcoming such as a lack of a desired conventional hardware/assembly instruction to bring matrix data into Floating Point Registers in a desired matrix transpose format.

2. Description of the Related Art

Scientific computing relies heavily on linear algebra. In fact, the whole field of engineering and scientific computing takes advantage of linear algebra for computations. Linear algebra routines are also used in games and graphics rendering. Typically, these linear algebra routines reside in a math library of a computer system that utilizes one or more linear algebra routines as a part of its processing. Linear algebra is also heavily used in analytic methods that include applications such as a supply chain management.

A number of methods have been used to improve performance from new or existing computer architectures for linear algebra routines. However, because linear algebra permeates so many calculations and applications, a need continues to exist to optimize performance of matrix processing.

More specific to the technique of the present invention and as recognized by the present inventors, performance loss can occur for linear algebra processing in new computer architectures in which one or more conventional hardware or assembly instructions are lacking or deliberately excluded in order to reduce chip complexity and cost.

SUMMARY OF THE INVENTION

In view of the foregoing and other exemplary problems, drawbacks, and disadvantages of the conventional systems, it is, therefore, an exemplary feature of the present invention to provide various techniques that improve performance for linear algebra routines.

It is another exemplary feature of the present invention to provide a method and structure to provide higher-performance linear algebra routines for environments in which one or more conventional hardware or assembly instructions are missing.

It is another exemplary feature of the present invention to deal with new computer architectures and assembly languages in a better manner than previous methods and to demonstrate a general methodology for masking architectural shortcomings.

In a first exemplary aspect of the present invention, described herein is a computerized method of executing a matrix operation, including, for a matrix A, separating the matrix A into blocks, each block having a size p-by-q, and storing the matrix data in a cache or memory in a different format. The new format is at least one of a new format in which elements of a block are stored in a different location relative to its original position in the block and/or a new format in which blocks of size p-by-q are stored such that at least one block occupies a different position relative to its original position in the matrix A.

In a second exemplary aspect of the present invention, described herein is an apparatus including a reader to read a data of a matrix A, a separator to separate the data into blocks of a size p-by-q, a calculator to calculate a new position of block elements and/or blocks that differ from an original position in the matrix A. A memory loader stores the blocks into a memory, the different positioning of blocks being a register block data format of the matrix A.

In a third exemplary aspect of the present invention, described herein is a data structure in a computer program executing a matrix operation, the data structure including, for a matrix A, separating the matrix A into blocks, and storing the data into a memory or cache according to a new format as described above.

In a fourth exemplary aspect of the present invention, described herein is a signal-bearing medium tangibly embodying a program of machine-readable instructions executable by a digital processing apparatus to perform a method of storing information of a matrix in accordance with the above-described method.

In a fifth exemplary aspect of the present invention, described herein is a method of providing a service that includes at least one of: using a linear algebra software package that computes one or more matrix subroutines, wherein the linear algebra software package processes a matrix data for a matrix A in accordance with the above-described method; providing a consultation for solving a scientific/engineering problem using the linear algebra software package; transmitting a result of the linear algebra software package on at least one of a network, a signal-bearing medium containing machine-readable data representing the result, and a printed version representing said result; and receiving a result of the linear algebra software package on at least one of a network, a signal-bearing medium containing machine-readable data representing the result, and a printed version representing the result.

BRIEF DESCRIPTION OF THE DRAWINGS

The foregoing and other exemplary features, aspects and advantages will be better understood from the following detailed description of exemplary embodiments of the invention with reference to the drawings, in which.

DETAILED DESCRIPTION OF EXEMPLARY EMBODIMENTS OF THE INVENTION

Figure 1:
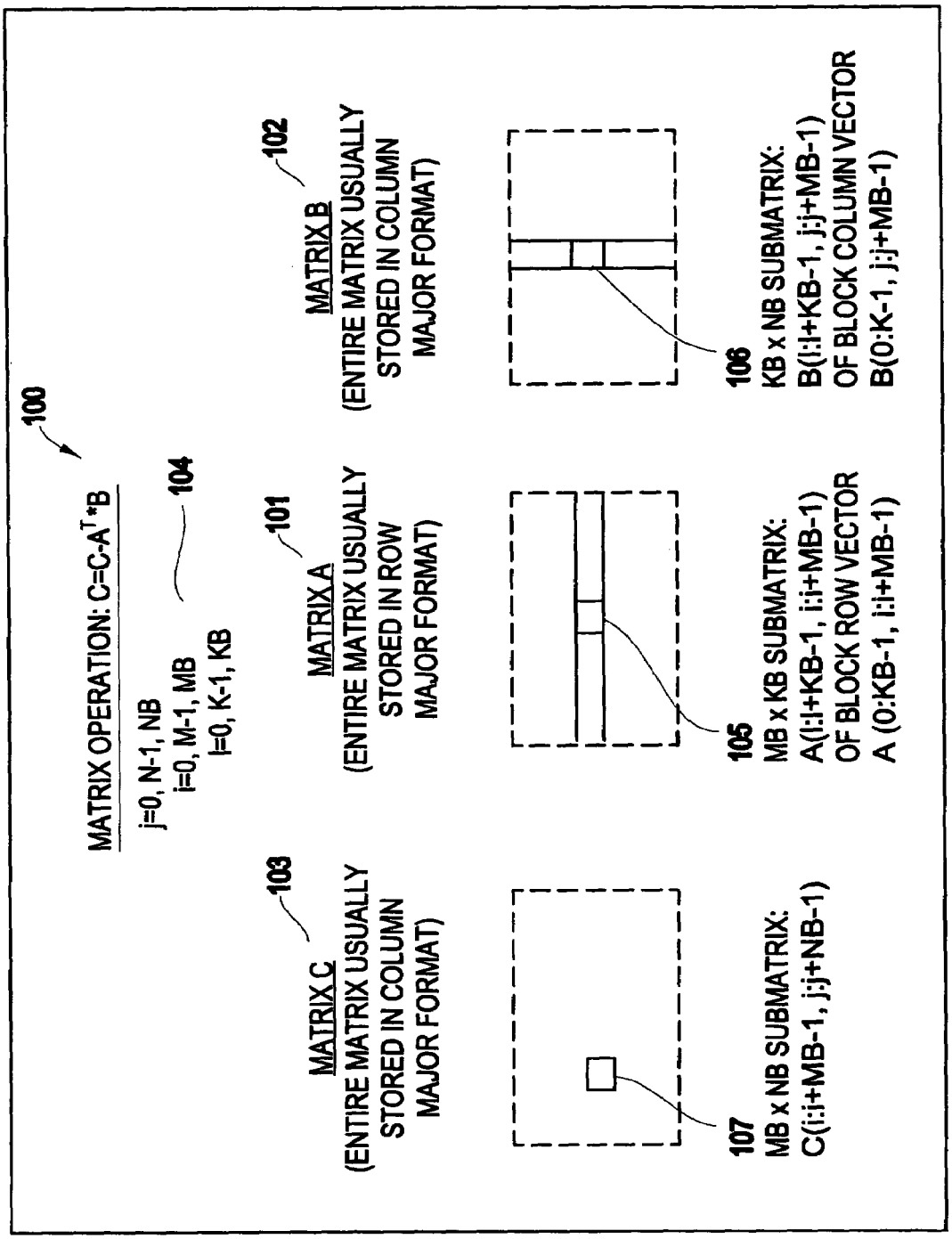
FIG. 1 illustrates an exemplary linear algebra operation 100.

Referring now to the drawings, and more particularly to FIGS. 1-8, an exemplary embodiment will now be described. In this exemplary embodiment, matrix data will be stored in a modified format in memory, which the inventors choose to call an example of "register block data format". In the special case where the block size is 2-by-2, the register block data format is referred to as a "pseudo-matrix". The matrix, partitioned into register block data format, is brought into a floating point unit (FPU) in which the floating point registers (FRegs) are viewed in a specific manner (e.g., "checkerboarding") so that a combination of two "errors" can be used to overcome lack of a hardware or assembly instruction for bringing the matrix into the FPU in a preferred format.

The present invention addresses, generally, efficiency in the calculations of linear algebra routines. FIG. 1 illustrates processing of an exemplary matrix operation 100 (e.g., $C=C-A^T*B$). In processing this operation, matrix A is first transposed to form transpose-matrix-A (e.g., $A^T$) 101. Next, transposed matrix $A^T$ is multiplied with matrix B 102 and then subtracted from matrix C 103. The computer program executing this matrix operation will achieve this operation using three loops 104 in which the element indices of the three matrices A, B, C will be varied in accordance with the desired operation.

That is, as shown in the lower section of FIG. 1, the inner loop and one step of the middle loop will cause indices to vary so that MB rows 105 of matrix $A^T$ will multiply with NB columns 106 of matrix B. The index of the outer loop will cause the result of the register block row/column multiplications to then be subtracted from the MB-by-NB submatrix 107 of C to form the new submatrix 107 of C. FIG. 1 shows an exemplary "snapshot" during execution of one step of the middle loop i=i:i+MB−1 and all steps of the inner loop l, with the outer loop j=j:j+NB−1.

The above matrix operation $C=C-A^T*B$ is now examined in more depth. At any point the operation is: C(i:i+MB−1, j:j+NB−1)=C(i:i+MB−1, j:j+NB−1)−A(l:l+KB−1, i:i+MB−1)*B(l:l+KB−1, j:j+MB−1). Using standard column major format for C, $A^T$, and B would mean that the elements in submatrices C(i:i+MB−1, j:j+NB−1), $A^T$ (l:l+KB−1, i:i+MB−1) and B(l:l+KB−1, j:j+NB−1) are not stored contiguously in some order that is advantageous for the FPU.

Therefore, a key idea of the present invention is to store each of these three submatrices contiguously in some representation (permutation) that has an optimal advantage for the L1 cache-FPU register interface of a particular architecture. It is noted that register sets such as the FPU registers are referred to herein as the "L0" cache.

The C, $A^T$, B submatrices have CE=MB*NB, AE=KB*MB, and BE=KB*NB elements, respectively. Thus, there are CE!, AE!, BE! stride one representations to choose from in order to achieve an optimal advantage for the L1 cache-FPU register interface. In accordance with the present invention, for a given architecture, a particular MB, NB, KB will be chosen and then a particular permutation from each of the possible CE!, AE!, BE! choices will be chosen.

It is also noted that the above-listed fourth and fifth copending applications on preloading and prefetching, as well as the sixth application on six choices of the kernel routines (in the present application, only one of the six possible kernels are focused on), are all related, but independent, aspects of obtaining optimal performance for matrix multiplication.

In the context of the present invention, the prefetching discussed elsewhere retrieves the C, $A^T$, B submatrix blocks to L1 ahead of time. The preloading technique transfers the C, $A^T$, B submatrix blocks to the FPU registers in a timely manner for the FPU executions and subsequent transfer of the FPU results back to the L1 cache, higher order caches, or the memory.

Finally, for the choice of having six kernels, instead of one, allows for having six choices to optimize. This optimization depends on a number of parameters, including, for example, whether the matrix processing program is oriented in row major or column major.

However, before presenting the exemplary details of the present invention, the following general discussion provides a background of linear algebra subroutines and computer architecture as related to the terminology used herein.

Linear Algebra Subroutines

The explanation of the present invention includes reference to the computing standard called LAPACK (Linear Algebra PACKage) and to various subroutines contained therein. Information on LAPACK is readily available on the Internet.

For purpose of discussion only, Level 3 BLAS (Basic Linear Algebra Subprograms) of the LAPACK (Linear Algebra PACKage) are used, but it is intended to be understood that the concepts discussed herein are easily extended to other linear algebra mathematical standards and math library modules.

When LAPACK is executed, the Basic Linear Algebra Subprograms (BLAS), unique for each computer architecture and provided by the computer vendor, are invoked. LAPACK comprises a number of factorization algorithms for linear algebra processing.

For example, Dense Linear Algebra Factorization Algorithms (DLAFAs) include matrix multiply subroutine calls, such as Double-precision Generalized Matrix Multiply (DGEMM). At the core of level 3 Basic Linear Algebra Subprograms (BLAS) are "L1 kernel" routines which are constructed to operate at near the peak rate of the machine when all data operands are streamed through or reside in the L1 cache.

The most heavily used type of level 3 L1 DGEMM kernel is Double-precision A Transpose multiplied by B (DATB), that is, $C=C-A^T*B$, where A, B, and C are generic matrices or submatrices, and the symbology $A^T$ means the transpose of matrix A. It is noted that DATB is the only such kernel employed by today's state of the art codes, although DATB is only one of six possible kernels.

The DATB kernel operates so as to keep the A operand matrix or submatrix resident in the L1 cache. Since A is transposed in this kernel, its dimensions are K1 by M1, where K1×M1 is roughly equal to the size of the L1. Matrix A can be viewed as being stored by row, since in Fortran, a non-transposed matrix is stored in column-major order and a transposed matrix is equivalent to a matrix stored in row-major order. Because of asymmetry (C is both read and written) K1 is usually made to be greater than M1, as this choice leads to superior performance.

Exemplary Computer Architecture

Figure 2:
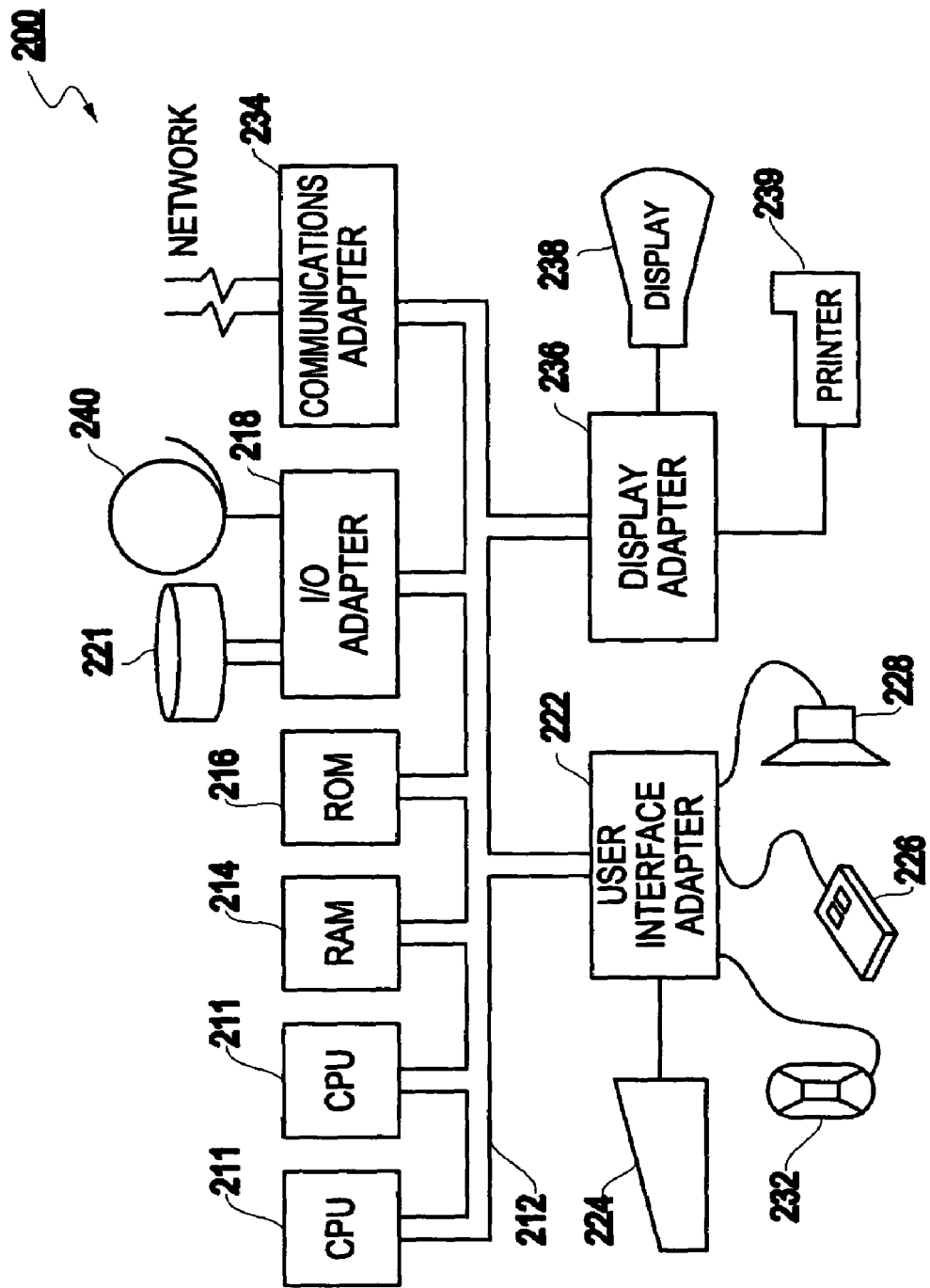
FIG. 2 illustrates an exemplary hardware/information handling system 200 for incorporating the present invention therein.

FIG. 2 shows a typical hardware configuration of an information handling/computer system 200 usable with the present invention. Computer system 200 preferably includes at least one processor or central processing unit (CPU) 211. Any number of variations are possible for computer system 200, including various parallel processing architectures and architectures that incorporate one or more FPUs (floating-point units).

In the exemplary architecture of FIG. 2, the CPUs 211 are interconnected via a system bus 212 to a random access memory (RAM) 214, read-only memory (ROM) 216, input/output (I/O) adapter 218 (for connecting peripheral devices such as disk units 221 and tape drives 240 to the bus 212), user interface adapter 222 (for connecting a keyboard 224, mouse 226, speaker 228, microphone 232, and/or other user interface device to the bus 212), a communication adapter 234 for connecting an information handling system to a data processing network, the Internet, an Intranet, a personal area network (PAN), etc., and a display adapter 236 for connecting the bus 212 to a display device 238 and/or printer 239 (e.g., a digital printer or the like).

Although not specifically shown in FIG. 2, the CPU of the exemplary computer system could typically also include one or more floating-point units (FPUs) that performs floating-point calculations. Computers equipped with an FPU perform certain types of applications much faster than computers that lack one. For example, graphics applications are much faster with an FPU. An FPU might be a part of a CPU or might be located on a separate chip. Typical operations are floating point arithmetic, such as fused multiply/add (FMA), addition, subtraction, multiplication, division, square roots, etc.

Figure 3:
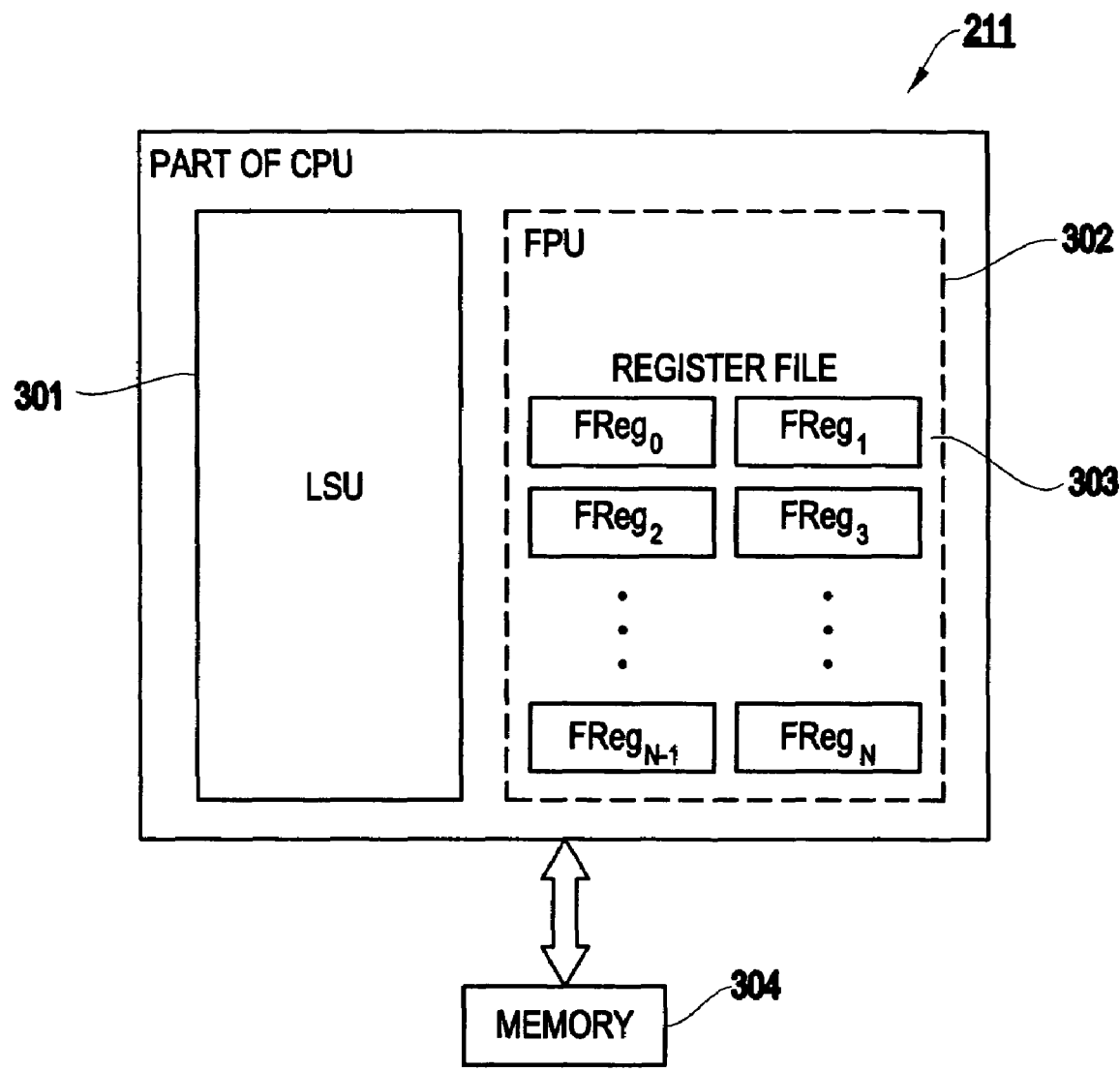
FIG. 3 exemplarily illustrates a CPU 211 that includes a floating point unit (FPU) 302.

Details of the FPU is not so important for an understanding of the present invention, since a number of configurations are well known in the art. FIG. 3 shows an exemplary typical CPU 211 that includes at least one FPU 302. The FPU function of CPU 211 controls the FMAs (floating-point multiply/add), and at least one load/store unit (LSU) 301, which loads/stores data to/from memory device 304 into the floating point registers (FReg's) 303). The register set 303 in a co-processor unit such as the FPU can also be considered as the "L0" cache.

It is noted that, in the pretext of the present invention involving linear algebra processing, the term "FMA" can also be translated either as "fused multiply-add" operation/unit or as "floating-point multiply followed by floating point add" operation/unit, and it is not important for the present discussion which translation is used. The role of the LSU 301 is to move data from a memory device 304 external to the CPU 211 to the FRegs 303 and to subsequently transfer the results of the FMAs back into memory device 304, typically via the L1 cache. It is important to recognize that the LSU function of loading/storing data into and out of the FRegs 303 occurs in parallel with the FMA function.

Figure 4:
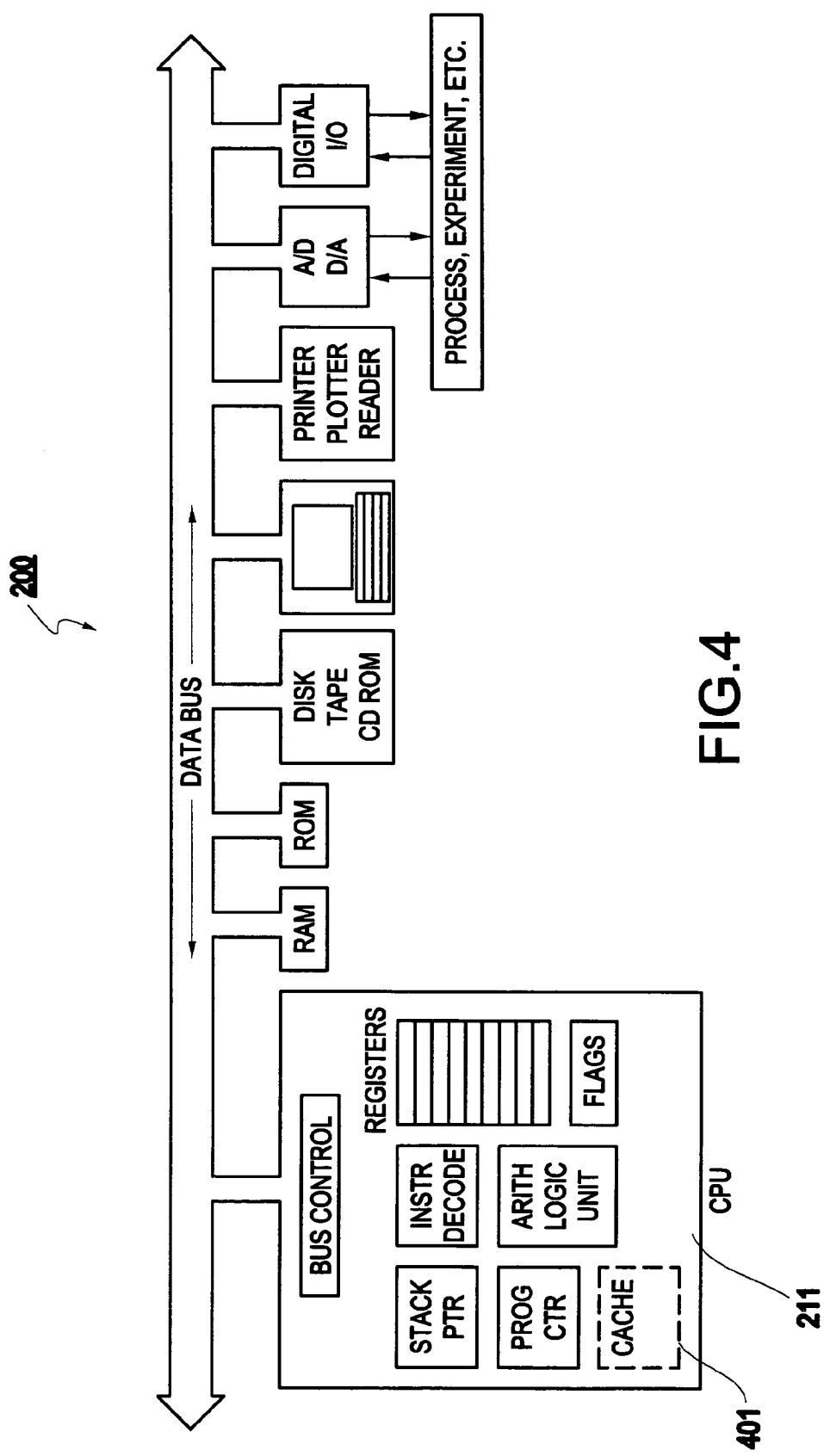
FIG. 4 exemplarily illustrates in more detail the CPU 211 that might be used in the computer system 200 for the present invention.

Another important aspect of the present invention relates to computer architecture that incorporates a memory hierarchy involving one or more cache memories. FIG. 4 shows in more detail how the computer system 200 might incorporate a cache 401 in the CPU 211.

Discussion of the present invention includes reference to levels of cache, and more specifically, level 1 cache (L1 cache). Level 1 cache is typically considered as being a cache that is closest to the CPU and might even be included as a component of the CPU, as shown in FIG. 4.

The details of the cache structure and the precise location of the cache levels are not so important to the present invention so much as recognizing that memory is hierarchical in nature in modern computer architectures and that matrix computation can be enhanced considerably by modifying the storage representation of a matrix that is the data of matrix subroutines to include considerations of the memory hierarchy.

Additionally, in the present invention, it is preferable that the matrix data be laid out contiguously in memory in "stride one" form. "Stride one" means that the data is preferably contiguously arranged in memory to honor double-word boundaries and that the useable data is retrieved in increments of the line size. This contiguous arrangement of data facilitates bringing the data from higher levels of memory or higher levels of cache into L1 cache.

However, in the present invention, additionally it is necessary to transfer the L1 matrix data into FPU registers in an optimal manner.

Various of the above-listed copending application address the availability of six kernel types in matrix processing. The importance of having six kernel types available is that stride one memory access is desirable for matrix processing. The matrices A and B are stored either by row or by column. By having six kernel types, one can choose a kernel in which stride one is available for both operands.

In the next paragraphs on pseudo-transpose, it is shown how to re-order the MB=2 and KB=2 subblocks of $A^T$ into one of 4!=24 permutations. The permutation selected, which is optimal for the given architecture, does not lead to the standard row or column major representation used by programming languages Fortran and C. In terms of these languages, the arrangement is no longer a standard submatrix. Hence, a term used in the present invention is "pseudo".

Pseudo-Transpose

The pseudo-transpose data format of the present invention can be used to mask a hardware-level instruction shortcoming (i.e., the lack of a desired hardware/assembly instruction).

Figure 5:
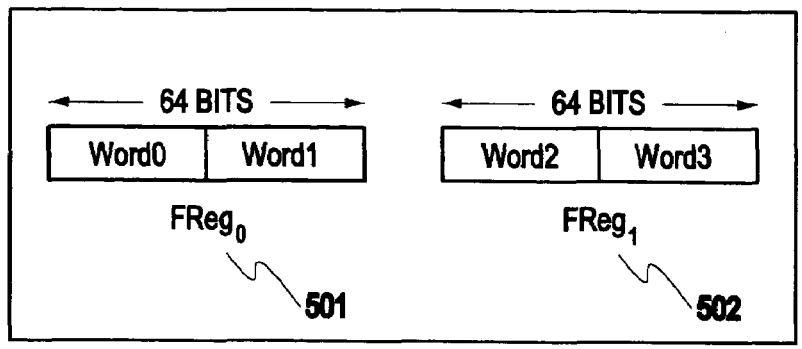
FIG. 5 illustrates an exemplary pair of floating point registers 501, 502 in a floating point unit register bank.
Figure 6:
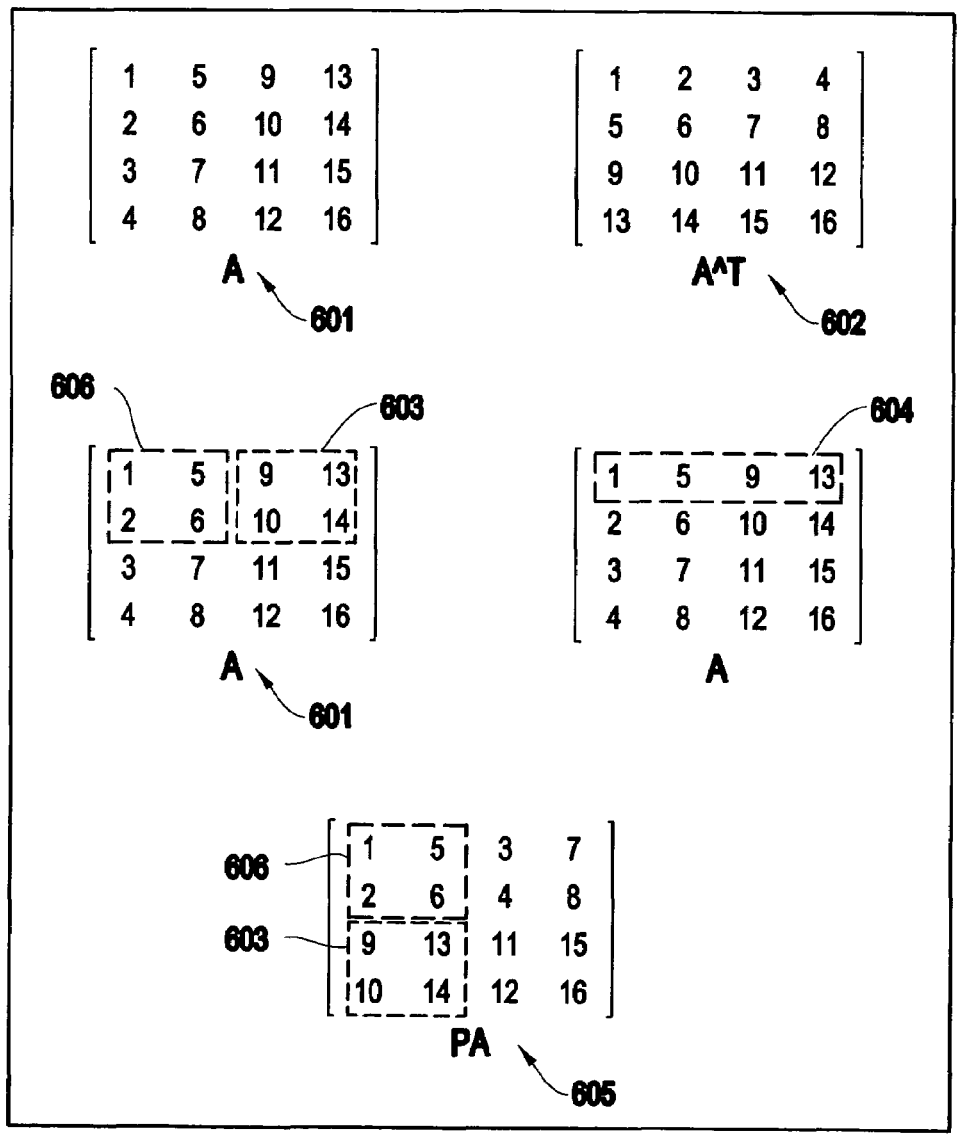
FIG. 6 illustrates pictorially the concept of converting a matrix A into the pseudo-matrix format 605.

As an example of a hardware "deficiency" to be overcome in software by the concept by the present invention is shown in FIG. 5 and FIG. 6. A word length is assumed exemplarily as being 32 bits (four bytes) and it is assumed that the application requires that data be processed in double-word (e.g., 64 bits) increments 501.

A CPU is typically designed around this concept of 32-bit words and would have 32-bit-wide registers. However, a floating-point processor unit (FPU) typically is designed to execute in double-word (64-bit) increments as the basic data processing unit and sometimes processes floating-point arithmetic calculations using two such double-word data units. That is, the FPU typically has an FReg 501, 502 register-width of 64 bits (i.e., double-word registers) and the LSU 301 retrieves/stores data between memory/registers in increments of 64 or 128 bits.

Moreover, in the design of the FPU 302 for an exemplary computer supported by the present invention, the FPU 64-bit register loading/storing is executed using a "quad-load" format, meaning that the four words to be loaded-into/stored-from two double-word registers 501, 502 are actually accessible in units of four single-word lengths. Thus, quad-loading causes two consecutive single-words to be loaded into $FReg_0$ 501 as $Word_0$ and $Word_1$ and two consecutive single-words to be loaded into $FReg_1$ 502 as $Word_2$ and $Word_3$. However, quad-loading also allows the double words to be flipped (reversed) so that, for example, the contents of $Word_0/Word_1$ and $Word_2/Word_3$ would be reversed.

As shown in FIG. 1, matrix A would typically be processed in a LAPACK linear algebra subroutine as A transpose (i.e., $A^T$), shown in FIG. 6 as label 602. The problem encountered in the hardware of a computer-under-design, which resulted in an exemplary solution of the present invention, is that kernel-level matrix processing of LAPACK would be typically based on submatrices that are 2-by-2 data blocks.

That is, a BLAS kernel would typically work with increments of 2-by-2 data blocks, such as illustrated by the dashed box 603. Unfortunately, conventional computer architecture/assembly instructions would be based on the concept of memory transfers based on line size, more appropriately shown as dashed box 604, if matrix A 601 was stored in memory in stride-one format.

To overcome the deficiency that the computer-under-design had no special hardware/assembly instruction to break 2-by-2 blocks out of memory for loading into the FRegs, the present invention utilizes a "pseudo-matrix" concept shown in FIG. 6 as pseudo-matrix 605.

In essence, in the present invention, matrix A (601) is stored in memory in pseudo-matrix format 605, rather than transpose matrix format 602. It can be seen that the pseudo-matrix format 605 is based on considering 2-by-2 blocks as a basic pseudo element block. It should also be apparent from comparing normal matrix A (601) with pseudo-matrix 605 that the 2-by-2 block 603 is actually in a "transposed" position relative to its adjacent 2-by-2 block 606.

That is, for the 2-by-2 block 603, in the pseudo-matrix 605, this block 603 occupies the column major location from its original position in the matrix. It is noted that blocks on the diagonal (e.g., 2-by-2 block 606) will continue to occupy the original diagonal location in the pseudo-matrix 605.

Further, in comparing the pseudo-matrix 605 with the transposed matrix 602, required by the exemplary matrix processing algorithm in FIG. 1, it can be seen that the transpose matrix 602 would now result from the pseudo-matrix 605 if the single words of each of the 2-by-2 blocks 603, 606 are loaded into specific predetermined words of the appropriate FRegs, and that the appropriate relocation involves a crisscrossing of one of the diagonals.

That is, for example, in 2-by-2 block 606 in pseudo-matrix 605, it can be seen that the required transpose would result when diagonal elements "2" and "5" are crisscrossed, and in 2-by-2 block 603, the transpose occurs when diagonal elements "10" and "13" are crisscrossed.

In the present invention, this predetermined placement in the FRegs is accomplished by considering the words of the FRegs as a "checkerboard", in which quad-loading of the pseudo-matrix data is appropriately matched to words in the FRegs to thereby result in the transpose format 602 in the FRegs. Therefore, even though no special computer instruction exists in the computer instruction set that will allow a matrix transpose to be loaded into the FRegs efficiently, by first loading matrix A into the novel format of the present invention, followed by a modified version of quad-loading, the matrix A can be efficiently loaded into FRegs in the required transpose format.

Thus, in effect, the present invention makes two "errors" to arrive at loading the matrix A into transpose matrix format 602 in the registers of the FPU. First, the data is stored in memory in pseudo-matrix format 605. Second, the pseudo-matrix data 605 is loaded from memory into the FRegs using quad-loading, but the quad-loading is modified in a predetermined way so that the transpose format 602 results from the loading.

It should be apparent that the reverse could also be accomplished to store data back into memory from the FRegs.

It should also be apparent from the explanation for 2-by-2 blocks typically used for matrix processing, that the concept could be generalized. The generalization of "pseudo-transpose data format" is "register-block data format" and will be further discussed later.

Figure 7:
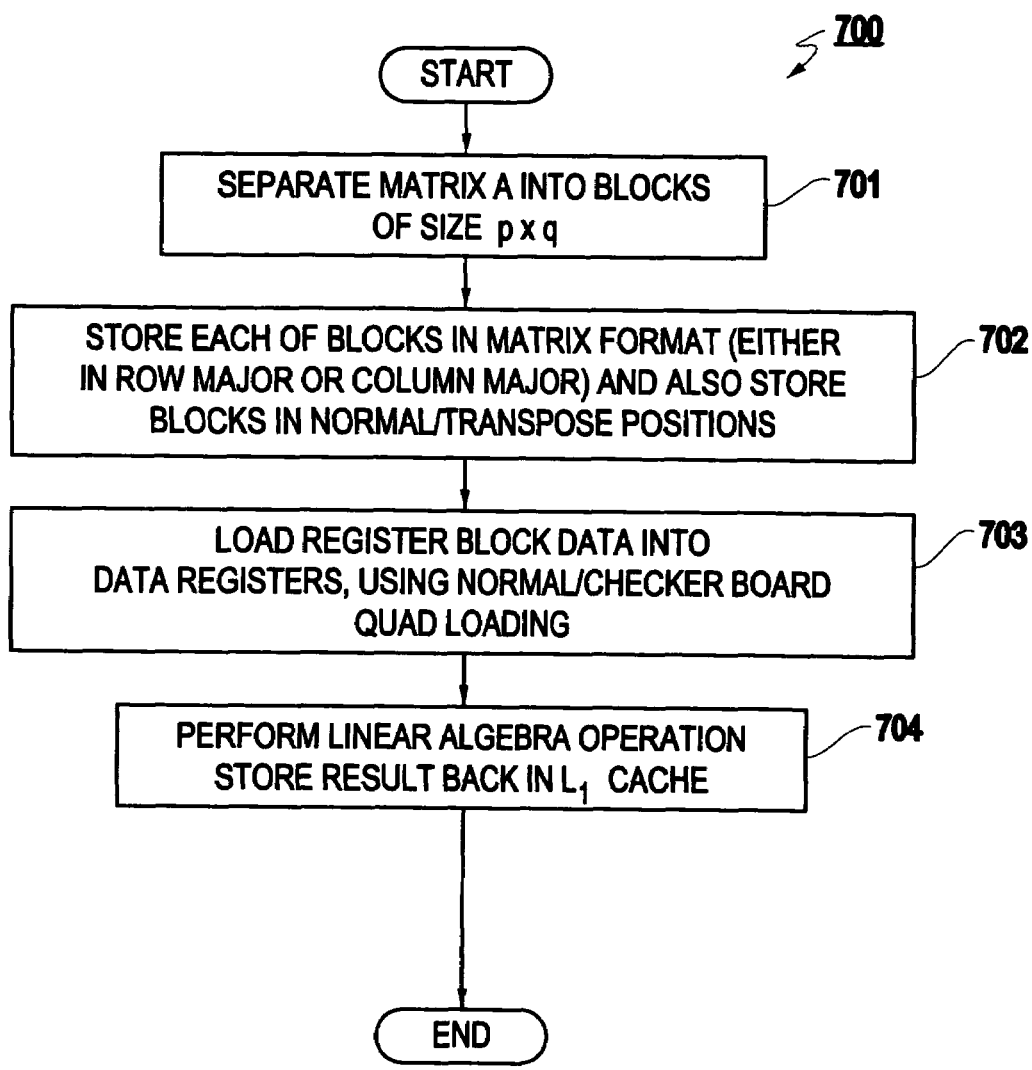
FIG. 7 illustrates a method 700 for the conversion of matrix A into pseudo-matrix format and the subsequent loading of the pseudo-matrix format into a series of data registers.
Figure 8:
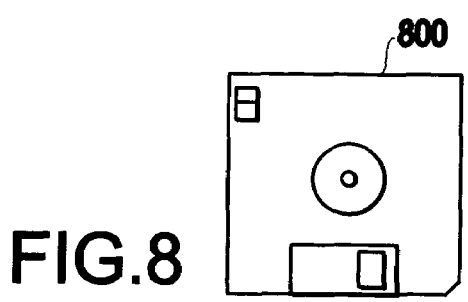
FIG. 8 illustrates a signal bearing medium 800 (e.g., storage medium) for storing steps of a program of a method according to the present invention.

FIG. 7 shows an exemplary flowchart 700 of the pictorial conversion shown in FIG. 6. In step 701, matrix A is separated into blocks of a predetermined size p-by-q (e.g., 2-by-2). As discussed above, for the exemplary repositioning of blocks that illustrate the present invention, in step 702, the matrix A is stored in register block format by storing the blocks in normal/transposed positions relative to the position of the register blocks of matrix A. This normal/transposed configuration is appropriate for solving the specific computer architectural problem presented to being solved by the present invention. However, it should be apparent that any number of other repositioning configurations might be appropriate. As possible examples, repositioning might be based on a concept of diagonals or wrap-around. Steps 701 and 702 would typically be done simultaneously.

In step 703, the register block data is loaded into a register pair of data registers, using either a normal or a checkerboard quad load so as to result in having data in the register pair of data registers as being either the normal or the transpose form of the register block of matrix A.

In step 704, the contents of the register pair of data registers are used in a linear algebra operation, such as a LAPACK BLAS subroutine, with the result being stored in another pair of data registers or back into L1 cache.

The exemplary description above is now formalized in the case p=q=2.

Definition: Pseudo-Matrix for SIMD (Single Instruction, Multiple Data stream processing) FPU case:

Let $A^T$ consist of two-by-two submatrices, where element $A^T(i:i+1, l:l+1)=A(l:l+1, i:i+1)$. Now let each two-by-two block of PA hold $A^T(i:i+1, l:l+1)^T$. (See FIG. 6, where A has order n=4.)

Although this formal idea will be described in the context of a single processor machine, extensions to both SMP (Symmetric MultiProcessing) and uni-processor SIMD architectures are quite straightforward.

For purposes of concreteness, an architecture with 32 register-pairs and a dual SIMD configuration will be considered. The design details of the level 3 (BLAS), L1 cache kernel routine are delineated (below, in computer code) for a single-processor machine and the design can be extended for this example. Thus, it suffices to consider the level 3 L1 DGEMM kernel, as demonstrated below in code.

The pertinent fact is that one wishes to use a matrix multiplication kernel that uses mn registers for C, km registers for A, and kn registers for B, where mn+k(m+n)<# available machine registers. Further, it is wise to prepare the data so that it can be accessed (streamed) through the L1 cache, as each element is used multiple times by the FPU.

The pseudo-transpose idea allows for the following extensions:

a) To machines with multiple SIMD FPUs, where the hardware/assembly-level instructions would preclude a straightforward extension of this approach (i.e. from k=1 to k=2; also, k0=1 to k0=2 in the RMP function code section below);

b) Without paying any noticeable performance penalty (data preparation overhead is almost inconsequential, as it is combined with data preparation for streaming); and c) With little to no additional coding or code maintenance work.

For additional explanation, the Algorithms and Architectures approach is used to consider an example that arose in practice. It should be pointed out that the problem encountered here (in this example) can be seen in the hardware-language instruction sets for other, new architectures. From the algorithm side, 2-by-2 submatrices will be used to express the 4-by-4 by 1 DATB (double precision A^T*B) kernel in the Matlab code below:

L1 Kernel for Computing $C=A^T*B+C$:

```
function Cout = DATB( m1, n2, k1, AR, BC, CC )
    % L1 kernel for computing C = A' * B + C
    % m1, n2, and k1 are integer multiples of m0, n0, and k0.
    % CReg, AReg, and BReg represent subsets of the registers
    % used for C, A, and B, respectively.
    % Parameter naming note:
    % The second character indicates the major-ordering of the
    % matrices. Thus, AC is A in column-major ordering. In both
    % MATLAB and Fortran, column-major corresponds to non-
    % transpose, while row-major ordering reflects a transposed
    % state; i.e. A^T (or A' in MATLAB notation).
    for j=1:n0:n2
        for i=1:m0:m1
            CReg = CC( i:i+m0−1, j:j+n0−1 );           % load submatrix of C
            % Perform operation CReg = CReg + AT(*,i:i+m0−1)*B(*,j:j+n0−1)
            for p=1:k0:k1
                AReg = AR( p:p+k0−1, i:i+m0−1 );       % load panel of A
                BReg = BC( p:p+k0−1, j:j+n0−1 );       % load panel of B
                CReg = AReg' * BReg + CReg;            % perform operation
            End
            CC( i:i+m0−1, j:j+n0−1 ) = CReg;           % store submatrix of C
        end
    end
Cout = CC
```

On the Hypothetical Machine (HM), this will require unrolling the inner (p) loop by 2, so that a 4-by-4-by-2 L1 DATB kernel is produced. The idea is extensible to other values of unrolling by logical extension.

It is noted that "loop unrolling" refers to a function call replaced with an instance of the function's body. Actual arguments are substituted for formal parameters. An unroll function is usually done as a compile-time transformation to increase the efficiency of the program. That is, loop unrolling includes replicating the body of a loop in order to reduce the number of iterations required to complete the loop and allows keeping operands in FRegs 303.

This can then be implemented by performing 2-by-2-by-1 submatrix computations on 2-by-2 submatrices. It is necessary to balance the use of the P(rimary) and S(econdary) register files. One way to do this is to use "red-black" or "checkerboard" register assignment. That is, a(i:i+1,j) is assigned to (P,S)/(S,P) if and only if i+j=(0/1) mod 2. It is noted that registers "P" and "S" correspond to "FReg$_0$" 501 and "FReg$_1$" 502 in FIG. 5.

From the architecture side, it is desired to preferably use the HM as a SIMD vector machine, for vectors of length two. The A matrix is chosen to hold vectors of length 2. The B matrix will also hold vectors of length 2. However, the components of B will be used as scale factors by this dual SIMD FPU. A simple example will clarify what is intended, as follows.

The first column of $C(i:i+1,j:j+1)=A(i:i+1,l:l+1)*B(l:l+1, j:j+1)$ is computed as:

$$\begin{matrix} a(i, l) \\ a(i+1, l) \end{matrix} * b(l, j) + \begin{matrix} a(i, l+1) \\ a(i+1, l+1) \end{matrix} * b(l+1, j)$$

and the second column is calculated in a similar fashion, using the two scalars, b(l:l+1,j+1). If i+l=0 mod 2 then a(i:i+1,l) is placed in a (P,S) register pair. Since i+l+1=1 mod 2 in this case, a(i:i+1,l+1) is placed in an (S,P) register pair.

Normally, to compute A*B quickly, a cache-resident A is necessary that "maps well" into L1 cache. Thus, A is stored preferably contiguously and is assumed accessible stride-one. Hence, it would be expected to transpose A preferably into a contiguous buffer in a data preparation phase. When this is done however, a real problem is encountered that appears to have no solution.

If a 2-by-2 submatrix, $A(l:l+1,i:i+1)$ of $A^T$ is considered, the HM processor's load unit only allows loading consecutive storage elements as vectors. For example, a(l:l+1,i) can be loaded into a (P,S) (or (S,P)) register pair (if column-major storage is assumed). However, to use the HM most efficiently, it is necessary to load, for example, a(l,i) and a(l,i+1) into a (P,S) register pair and a(l+1,i) and a(l+1,i+1) into an (S,P) register pair. This corresponds to the aforementioned vector computation, with i and l interchanged because of transposition.

These two disparate requirements can be reconciled in various ways. For example, "bending the algorithm" could be performed to "accommodate the architecture." The idea is to not form A^T in the contiguous buffer as would be done in the Matlab coding above. Rather, a pseudo matrix as mentioned earlier, which in reality is not a matrix, is formed. Also, as noted previously, this pseudo matrix is a special case of the general p-by-q register block matrix.

Let $A^T$ include 2-by-2 submatrices, where element $A^T(i:i+1,l:l+1)=A(l:l+1,i:i+1)$. Now let each 2-by-2 block of PA hold $A^T(l,i+1,l:l+1)^T$. It should be clear that this "mistake" in computing $A^T$ allows one to load the HM registers both correctly and most efficiently, as is described above. In effect, an example has been produced where "two wrongs" make a "right."

Next, a 2-by-2 by 2 kernel is illustrated below. The invention is computing "C=C−A*B". The actual Matlab code is given below.

```
Do J = 0, N-2, 2
   Do I = 0, M-2, 2
      P0, S0 = C(I:I+1,J)              ! P quad load
      S1, P1 = C(I:I+1,J+1)            ! S quad load
      Do L = 0, K-2, 2
         P8, S8 = B(L:L+1,J)           ! P Quad Load
         PC, SC = PA(L:L+1,I)          ! P Quad Load
         (P0,S0) <- (P0,S0) - (PC,SC) * P8   ! 00C8-11-01 DFMA
         S9, P9 = B(L:L+1,J+1)         ! S Quad Load
         (P1,S1) <- (P1,S1) - (SC,PC) * S9   ! 11C9-00-10 DFMA
         SD, PD = PA(L:L+1,I+1)        ! S Quad Load
         (P0,S0) <- (P0,S0) - (SD,PD) * S8   ! 00D8-00-10 DFMA
         (P1,S1) <- (P1,S1) - (PD,SD) * P9   ! 11D9-11-01 DFMA
      EndDo
      C(I:I+1,J) = P0, S0              ! P Quad Store
      C(I:I+1,J+1) = S1, P1            ! S Quad Store
   EndDo
EndDo
```

Note: A single HM operation has the syntax (D, B, A, C, BPS, BPA, BPC, BSS, BSA, BSC), where D,B,A,C are the four register numbers of a FPU (P,S) register pair and the remaining six entries are Boolean variables signifying sign and MUX settings of the (P,S), A, and C operands.

The full 4-by-4 by 2 kernel that computes C=C−A*B is made up of four 2-by-2 by 2 code fragments. The following register layouts are recommended:

| C(i:i+3,j:j+3) =   | P0 | S1 | P4 | S5 |
|---                 |--- |--- |--- |--- |
|                    | S0 | P1 | S5 | P5 |
|                    | P2 | S3 | P6 | S7 |
|                    | S2 | P3 | S6 | P7 |
| B(l:l+1,j:j+3) =   | P8 | S9 | PA | SB |
|                    | S8 | P9 | SA | PB |
| PA(l:l+1,i:i+3) =  | PC | SD | PE | SF |
|                    | SC | PD | SE | PF |

The outer loops on J and I would be unrolled by four. Before entering the inner loop, register pairs 0 to 7 would be loaded with 16 elements of C. The inner loop on L would be unrolled by two. Each pass through the inner loop would consist of two sets of two quad-loads of PA and four quad loads of B. These eight quad loads will feed 16 dual FMA (DMFA) instructions.

The resulting code, which is a simple extension of the single-processor code (this is true in both Matlab and C/Fortran) achieves laudable performance on real architectures. This idea will result in similar performance for other new architectures as well.

As a second example in which an architecture/assembly instruction would benefit from the present invention, the Intel P3 and P4 processors have SSE(1,2) instructions. These are Intel Streaming InStruction Extensions and allow for the execution of two floating point multipliers and two floating point additions (double precision) in a single cycle. Thus, use of the SSE# instructions provide a potential for a factor-of-two performance gain on floating point intensive computation. By using the pseudo transpose data format described above, the benefit of this 100% performance gain can be realized.

The pseudo-matrix discussed above is a special case of the register block data format in that its size is 2-by-2. That is, the generalization of "pseudo-matrix data format" is "register block data format", which is a p-by-q block where p and q are small integers so that the pieces of these such blocks can then be fitted into the registers of a particular architecture to achieve a desirable data format stored in these registers.

The layout of these blocks could be arbitrary. As noted, there are AE! choices for the submatrix block of A. As discussed above, in usual cases, the p-by-q sub-blocks will be laid out either in row- or column-major format. But a key idea of the present invention is that the arbitrary layout of these blocks is tailored to the architectural design of the FPU and its associated floating point registers FReg's. It should be apparent that different architectural or instruction set scenarios would provide a need to layout the blocks differently from the exemplary layout of the present invention. It is intended that these different layouts, as required by unique architectural/instruction-set combinations, be considered within the scope of the present invention, since the present invention is intended to teach that dividing matrix data into blocks and shifting locations of these blocks can be a basic technique to overcome "deficiencies" in computer architectural or instruction set design.

In addition to the hardware/software environment described above, a different exemplary aspect of the invention includes a computer-implemented method for performing the invention.

Such a method may be implemented, for example, by operating a computer, as embodied by a digital data processing apparatus, to execute a sequence of machine-readable instructions. These instructions may reside in various types of signal-bearing media.

Thus, this exemplary aspect of the present invention is directed to a programmed product, comprising signal-bearing media tangibly embodying a program of machine-readable instructions executable by a digital data processor incorporating the CPU 211 and hardware above, to perform the method of the invention.

This signal-bearing media may include, for example, a RAM contained within the CPU 211, as represented by the fast-access storage for example. Alternatively, the instructions may be contained in another signal-bearing media, such as a magnetic data storage diskette 800 (FIG. 8), directly or indirectly accessible by the CPU 211.

Whether contained in the diskette 800, the computer/CPU 211, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless.

The second exemplary aspect of the present invention can be embodied in a number of variations, as will be obvious once the present invention is understood. That is, the methods of the present invention could be embodied as a computerized tool stored on diskette 800 that contains a series of matrix subroutines to solve scientific and engineering problems using matrix processing in accordance with the present invention. Alternatively, diskette 800 could contain a series of subroutines that allow an existing tool stored elsewhere (e.g., on a CD-ROM) to be modified to incorporate one or more of the principles of the present invention.

The second exemplary aspect of the present invention additionally raises the issue of general implementation of the present invention in a variety of ways.

For example, it should be apparent, after having read the discussion above that the present invention could be implemented by custom designing a computer in accordance with the principles of the present invention. For example, an operating system could be implemented in which linear algebra processing is executed using the principles of the present invention.

In a variation, the present invention could be implemented by modifying standard matrix processing modules, such as described by LAPACK, so as to be based on the principles of the present invention. Along these lines, each manufacturer could customize their BLAS subroutines in accordance with these principles.

It should also be recognized that other variations are possible, such as versions in which a higher level software module interfaces with existing linear algebra processing modules, such as a BLAS or other LAPACK module, to incorporate the principles of the present invention.

Moreover, the principles and methods of the present invention could be embodied as a computerized tool stored on a memory device, such as independent diskette 800, that contains a series of matrix subroutines to solve scientific and engineering problems using matrix processing, as modified by the technique described above. The modified matrix subroutines could be stored in memory as part of a math library, as is well known in the art. Alternatively, the computerized tool might contain a higher level software module to interact with existing linear algebra processing modules.

It should also be obvious to one of skill in the art that the instructions for the technique described herein can be downloaded through a network interface from a remote storage facility.

All of these various embodiments are intended as included in the present invention, since the present invention should be appropriately viewed as a method to enhance the computation of matrix subroutines, as based upon recognizing how linear algebra processing can be more efficient by using the principles of the present invention.

In yet another exemplary aspect of the present invention, it should also be apparent to one of skill in the art that the principles of the present invention can be used in yet another environment in which parties indirectly take advantage of the present invention.

For example, it is understood that an end user desiring a solution of a scientific or engineering problem may undertake to directly use a computerized linear algebra processing method that incorporates the method of the present invention. Alternatively, the end user might desire that a second party provide the end user the desired solution to the problem by providing the results of a computerized linear algebra processing method that incorporates the method of the present invention. These results might be provided to the end user by a network transmission or even a hard copy printout of the results.

The present invention is intended to cover all of these various methods of implementing and of using the present invention, including that of the end user who indirectly utilizes the present invention by receiving the results of matrix processing done in accordance with the principles herein.

In conclusion, many new architectures, for economic considerations, eliminate hardware instructions that might be desirable in scientific computations. Here, a case was encountered where the lack of an instruction would seem to imply that a performance penalty would be paid in the context of matrix multiplication, which is a pervasive algorithm and a workhorse subroutine for such applications. The use of the pseudo-matrix concept allows one to overcome this disadvantage while incurring little extra work for the programmer and almost no performance penalty.

While the invention has been described in terms of an exemplary embodiment, those skilled in the art will recognize that the invention can be practiced with modification within the spirit and scope of the appended claims.

Further, it is noted that, Applicants' intent is to encompass equivalents of all claim elements, even if amended later during prosecution.

The invention claimed is:

1. A computer, comprising:
  a processor;
  a memory system; and
  a co-processing unit with an associated plurality of data registers for data exchange,
  wherein said computer is controlled to implement a method of increasing efficiency in executing a matrix operation that uses matrix data in a standard format, said standard format comprising one of a column major format and a row major format, said matrix operation being executed in said co-processing unit, said method comprising:
    for matrix data stored in said standard format in said memory system, wherein said matrix data comprises data of any of a complete matrix, a complete submatrix, or a part of a matrix or submatrix, using said processor to separate said matrix data into blocks of data, each said block having a size p-by-q; and
    rearranging by said processor and placing in said memory system of said computer, for retrieval in a repetitive manner for executing said matrix operation, said blocks of data to be contiguous data, wherein data within said blocks retain an original matrix data content but said blocks are moved to be in an ordering different from an original ordering of said blocks within said matrix, such that said matrix data is represented in a format that permits said matrix data to be moved from said memory system into a position in said plurality of data registers for performing said matrix operation more quickly than if said matrix data had been moved as stored in said standard format.

2. The computer of claim 1, wherein said size p-by-q comprises a 2-by-2 block.

3. The computer of claim 1, said matrix data thereby being stored in a register block format that differs from said standard format, said method further comprising:
  repetitively retrieving said matrix data from said memory system as matrix data in said register block format; and
  loading said matrix data into a subset of data registers in said register block format, said register block format predetermined to be an optimal format such that a minimal possible time is required to get said matrix data in said data registers correctly for said matrix operation in said co-processing unit.

4. The computer of claim 3, wherein said computer includes at least one of a machine architecture and an instruction set having one or more features that are less than optimal for executing said matrix operation in said standard format with said co-processing unit, and said register block format of matrix data and said loading, as comprising a fast loading made possible by said register format into said subset of data registers, together provide a mechanism that overcomes said one or more features that are less than optimal for executing said matrix operation.

5. The computer of claim 4, wherein said co-processing unit comprises a floating point unit (FPU) and said loading of said matrix data into said subset of data registers comprises loading said blocks from said memory system into a subset of data registers using a deviation from a single floating point loading instruction of the floating point unit (FPU) of the computer by loading data words in a different word order, using a multiple loading capability of said computer, thereby allowing a fast multiple loading of said data.

6. The computer of claim 5, wherein said loading comprises a crisscrossing or achieves an effect of a crisscrossing of elements about a diagonal of said blocks.

7. The computer of claim 5, said method further comprising:
selectively, at least one of loading input data and storing a result of said matrix operation into or out of said co-processing unit from an L1 cache or elsewhere in said memory system by at least one of a subset of optimal load and store instructions, said loading and storing being dictated by an optimal FPU loading or storage instruction.

8. The computer of claim 7, wherein said matrix operation comprises a linear algebra operation that comprises one of a BLAS kernel or a factorization kernel.

9. The computer of claim 5, wherein said loading in different word order, in combination with said register block format, provides a result data of a transpose of a submatrix of said matrix data to reside in said data registers of said FPU for said matrix operation.

10. A computer comprising:
a processor;
a storage; and
a co-processing unit,
said computer configured to implement a method of increasing efficiency in executing a matrix operation that uses matrix data in a standard format, said standard format comprising one of a column major format and a row major format, said method comprising:
converting, by said processor, at least a part of said matrix data into a new or optimal matrix format comprising contiguous data that no longer represents said matrix data in said standard format, said optimal matrix format comprising a representation of a subset of said matrix data that is predetermined to permit a loading of said matrix data from said storage into said co-processing unit optimally to perform said matrix operation in a minimal time in said processing unit, said optimal matrix format comprising a re-arrangement of blocks of said matrix data wherein data within each block retains its original values; and
repetitively loading a selected block of matrix data in said optimal matrix format into said co-processing unit for correctly executing said matrix operation.

11. The computer of claim 10, said method further comprising:
processing, by said co-processing unit, said matrix operation on data in said selected block, a result of said processing being stored in predetermined registers of said register set; and
storing said result from said predetermined registers of said register set into said storage.

12. A computer, comprising:
a processor;
a storage; and
a co-processing with an associated plurality of data registers for data exchange,
said computer having at least one of a machine architecture and an instruction set having one or more features that are less than optimal for executing a matrix operation, thereby causing a disadvantage in processing data for said matrix operation, said computer configured to implement a method of overcoming said disadvantage by software instructions, said method comprising:
rearranging, by said processor, at least a part of matrix data to be used in said matrix operation into a plurality of blocks, each block having size p-by-q, such that said matrix data is no longer stored in a standard matrix format comprising one of a row major format and a column major format, said rearranged matrix data in said blocks being stored in said storage as contiguous blocks of contiguous data in a new format such that an original content of data within said blocks is retained but an ordering of said blocks is changed, wherein said new format of said matrix data is predetermined to allow said matrix data to be placed from said storage into said co-processing unit for processing said matrix data in said matrix operation such that said disadvantage on said computer is overcome and said matrix processing will be correctly executed; and
repetitively loading said matrix data in said new format from said storage into at least a subset of said data registers of said co-processing unit in a new or optimal format that allows a minimal possible time to get data into said processing unit to utilize said matrix data in said matrix operation.

13. A computer, comprising:
a processor;
a storage; and
a co-processing unit with an associated a plurality of data registers for data exchange,
said computer configured to implement a method of overcoming a hardware disadvantage on said computer relative to a specific processing on a specific computer architecture/set of instructions using said co-processing unit, said hardware disadvantage reducing an efficiency of said specific processing, said method comprising:
using first software instructions to preliminarily process input data by said processor in a manner to generate a first error relative to said specific processing, said first error comprising a conversion of said input data into a predetermined new format of said input data; and
using second software instructions to subsequently process said input data in said new format in a manner to generate a correcting error relative to said specific processing, said correcting error comprising a loading said input data into said plurality of data registers in a new word order of said input data,
wherein first software instructions in combination with said second software instructions overcome said disadvantage and computes a correct result,
wherein said specific processing comprises a matrix operation, said disadvantage comprises a loading of matrix data from said storage into said co-processing unit that causes a non optimal processing of said matrix data in said matrix operation, said first error comprises storing said matrix data in said storage in a format that converts said matrix data from a standard column major or row major format into a new format predetermined to overcome said disadvantage when said data is subjected to said correcting error such that an original content of data within said blocks is retained but an ordering of said blocks is changed, and said correcting error comprises loading said data in said new format from said storage into said plurality of data registers using a loading format comprising a non standard word order of said matrix data, permitting said loading to be done optimally and said matrix processing to be done correctly.

* * * * *